Nov. 7, 1950  A. L. GENTER ET AL  2,528,649
SEWAGE TREATMENT PROCESS

Filed April 27, 1948  3 Sheets-Sheet 1

*INVENTOR.*
ALBERT L. GENTER
CLYDE C. KENNEDY
BY
*Cushman, Darby & Cushman*

INVENTOR.
ALBERT L. GENTER
CLYDE C. KENNEDY
BY
Cushman, Darby & Cushman

Patented Nov. 7, 1950

2,528,649

UNITED STATES PATENT OFFICE 2,528,649

SEWAGE TREATMENT PROCESS

Albert L. Genter, Baltimore, Md., and Clyde C. Kennedy, San Francisco, Calif.

Application April 27, 1948, Serial No. 23,576

19 Claims. (Cl. 210—2)

Our invention relates to sewage treatment and more particularly to the concentration of suspended solids in sludge digestion. Broadly speaking, sewage treatment is a solids dewatering process in that it involves a system of mutually related, progressive steps in removing suspended and settleable, decomposable solids from a large quantity of water. The removal of such solids takes place in various types of sedimentation basins or clarifiers wherein the mean displacement time or detention period of sewage under relatively quiescent conditions is about two hours and which usually permits the decantation of somewhat over 99.5% of the original water. If the decanted water is to be well purified, it is subjected to secondary purification and sedimentation treatments by various methods known to the art.

The wet sludge obtained by sedimentation is very retentive of water and, therefore, very voluminous. The percentage of water retained usually varies from 94% to 98%, and depends largely on the water-imbibing properties of organic-mineral complexes present in the solids. The amount of organic matter present is approximately measured in terms of volatile matter by combustion of the dried sludge solids. As a general rule it may be stated that the water content of sewage sludge is a function of the ratio of volatile to mineral matter present in the solids.

The organic fraction of sludge solids is destroyed by bacterial action during storage of freshly collected raw solids. Under properly controlled storage conditions a material portion may be destroyed. This process is widely used to render the putrescible sludge inoffensive and to diminish the amount of solids to be disposed of. To this end the collected fresh sludge is pumped to separate chambers, known as digestion tanks, or digesters, being first impregnated or seeded with aged sludge, and subjected to anaerobic decomposition which is properly controlled by seeding, heating and detention time. When properly controlled, bacterial action in sludge digestion usually destroys about 60% to 65% of the organic matter present in the fresh solids, and liberates copious quantities of useful methane gas. This action not only substantially reduces the ratio of organic to mineral matter present in the suspended solids, but in doing this, it increases both the solute concentration of decomposition products in the sludge water and the ratio of this water to the remaining suspended solids.

The detention time of sludge solids in digestion is largely a function of temperature. Whereas the detention time in plain sedimentation tanks for collecting fresh solids is but two hours and less, the detention time in separate heated digestion tanks is usually 30 to 40 days, or 360 to 480 times longer. For each million gallons daily of sewage flow, modern digestion tanks require two or three times more volume than that required for plain sedimentation and the tank construction is more expensive.

When plant loads increase beyond designed capacities, it becomes necessary to operate the digestion tanks at a high rate, meaning, at a rate considerably faster than originally intended. Some digester installations are purposely designed to operate at a high rate which may involve detention periods of 20 to 25 days' duration. This is done in order to economize in digestion space. Multistage digestion is at times helpful in high rate operation. This involves the use of two or more tanks in successive series. Active digestion with gas production takes place in the primary stage or stages and the concentration of digested solids by sedimentation, together with the production and separation of supernatant liquor, takes place in the secondary stages.

However, detention time in digestion is not the only factor governing the amount of digestion space and its effective capacity. Lack of solids concentration during all stages of digestion decreases the effective capacity of the digesters, increases both the amount of sludge liquor to be displaced as digester supernatant and the amount of suspended solids that remain to foul this supernatant, and causes a wastage of gas used in heating the diluted sludge in the tanks. With increased production of sludge liquor it becomes black with suspended digested and partially digested solids, which, if returned to the initial sedimentation basins of the plant, settle out in same to be recirculated back to digestion. This procedure constitutes another material decrease in effective digester capacity.

As previously emphasized the anaerobic digestion of organic sewage solids in digestion tanks necessarily increases the water content of a sludge. When related to the suspended solids present in the fresh and digested products this increase usually becomes about double that of the fresh sludge introduced to digestion, e. g., with 95% water and 5% solids in the fresh sludge the ratio of water to solids is 19 and with 50% destruction of these solids in digestion the percentage of water present becomes 97.5 which results in a water to solids ratio of 39. In order to decrease this ratio secondary digestion tanks are used. They are essentially storage tanks that permit the gravity separation of the digested solids from the associated sludge water by sedimentation of the former and the decantation of some of the latter, which is frequently termed digester supernatant, sludge liquor, supernatant liquor, etc.

The elimination of objectionable odors may be secured readily by operating primary stage digestion at a high rate. This results in tanks properly seeded and uniformly heated to temperatures ranging from 95° F. to about 100° F. Fifty per cent or more of the organic matter may then be destroyed. However, the satisfactory separation of suspended digested solids from sludge liquor in the secondary stages of digestion cannot be pushed at a high rate for the following reasons.

Most sludge digestion tanks operate with the liquid level constantly near the top of the tank in order to utilize the maximum available space. Consequently, when fresh sludge is pumped into the primary stage tank or tanks, it displaces an equal amount of digested sludge and liquor, either separately or together, into the secondary stage chamber which, in turn, usually displaces an equal volume of supernatant liquor from the second stage. As described in Patent No. 2,259,688 this digester overflow is usually returned to plain sedimentation in the main treatment plant while the bottom sludge of a lower water-solids ratio is withdrawn for further dewatering.

It is quite important to have the displaced digester overflow as free as possible of suspended solids and, at the same time, to have the bottom sludge as free as possible of fouled water as gravity separation can effect. These conditions cannot be met in conventionally operated high-rate digestion simply because the primary stage tank is kept in turmoil by very active digestion, with and without the aids of mechanical agitation, which makes the displacement of clear supernatant from primary-stage tanks impossible, if not undesirable. Consequently, large quantities of partially or incompletely digested solids enter the second-stage tanks and continue digesting, thereby causing undesired agitation of the tank contents in the second stage reserved for quiescent sedimentation and solids concentration.

As this concentrated sludge should contain a minimum percentage of fouled sludge liquor in order to render further disposal by transportation, lagooning or dewatering by draining and/or evaporation as economical as possible, it is desirable, and at times imperative, to decant a maximum quantity of digester liquor from the final stages of digestion. The volume of this decanted liquor is usually greater than the volume of concentrated sludge withdrawn from the bottom of the digestion tanks and sent to the final dewatering or disposal stages. The amount of this liquor which can be expected increases with the decrease in the percentage of solids in the fresh sludge pumped to digestion as well as with the increase in the percentage of organic matter destroyed by bacterial action during active digestion. It should be evident from the foregoing that the amount of suspended solids carried in the supernatant liquor is also a function of the loading of digestion chambers. As the loading increases with high-rate operation the percentage of suspended solids contained in the displaced digester liquor also increases. With thin sludges pumped to high-rate digestion the quantities of supernatant liquor and recirculated suspended solids become unreasonably large.

In some well-known treatment plants that have become overloaded, the quantity of digester liquor varies from about three to five times the quantity of concentrated sludge sent to dewatering. Furthermore, the suspended solids in this liquor varies from 10,000 to 35,000 parts per million (1% to 3.5%) by weight.

Returning such liquor to a plant primary settling system results in the resettlement of most of the digested and partially digested solids in this system, which together with the settled fresh solids, again results in a return trip of the digested material back to the digesters. A constantly recirculating load of such solids results. In some instances the quantity of these recirculated solids is about equal to the weight of digested solids sent to sludge dewatering.

Such a recirculating load does not recirculate the identical liquor and solids but a mixture of fresh and relatively inert solids which accumulates and remains in digestion for the normal detention period before being displaced. The chief economic evil of this recirculating load lies in uselessly depriving the treatment plant of a large fraction of costly digestion space. The quantity of recirculated digested solids does not decrease in digestion as does the quantity of fresh raw solids. The recirculated solids act entirely as an extra load of inert material added constantly to the newly collected, fresh solids from an outside source which is pumped to digestion to continually accumulate and occupy valuable digestion space. In the high-rate digestion of relatively thin fresh sludges (3% to 5% solids) the return to primary sedimentation of large quantities of digester supernatant containing 1% (10,000 parts per million) suspended solids can result in the loss of 25% to 40% of the digester capacity.

Our invention is both a solids dewatering and digestor liquor clarification step introduced between stages of digestion and is specifically adapted to high-rate operation of digestion tanks without the detrimental effects above-described. Compared with customary methods of operating digestion tanks it saves upward of 25% of primary and 50% of secondary digestion space and materially aids in subsequent sludge disposal steps by shrinking the volume of wet sludge to be handled.

It involves novel and highly useful extensions of principles discovered through the use of sludge elutriation according to Patents Nos. 1,999,973 and 2,259,688 issued to A. L. Genter, co-inventor in the present instance. The former patent applies to all types of sewage sludges subject to bacterial decomposition which results in the sludge water associated with the organic solids becoming fouled with biochemical solutes during detention in various tanks used for sedimentation, storage and digestion in sewage treatment. Patent No. 2,259,688 applies more specifically to the use of elutriation in connection with separate sludge digestion systems in order to both clarify digester overflow liquor and to accelerate the hydraulic subsidence of suspended sludge particles that foul same so the settled solids may be routed directly to further dewatering thus preventing their return back to plain sedimentation.

In the present instance the meaning of the term "elutriation" is substantially the same as in the foregoing patents, namely, a procedure involving first reducing the percentage of suspended solids and fouled solute in any portion of the liquid contents of a digester by dilution with water purer than the fouled solute, mixing of both, then the reconcentration of the suspended solids by hydraulic subsidence and decantation of the supernatant elutriate containing less suspended solids. Whereas in the cited patents elutriation is primarily used for reducing the concentration ratio of the biochemically fouled solute to sludge solids for the express purposes of saving chemical coagulant without regard to the amount of sludge storage and sludge digestion space, in the present instance it is primarily used for rendering high-rate digestion more effective in less space than the known art provides by clarifying the digester liquor and reducing in digestion both the ratio of associated water and inimical solute to sludge solids.

The present invention not only eliminates the circulating load of digested solids as intended and clearly covered by Patent No. 2,259,688, but produces the following additional advances in the art: (1) Permits thorough agitation of the liquid contents of digesters during the active stages of digestion in order to accelerate the digestion process and eliminate scum formation, (2) Accelerates the hydraulic subsidence of suspended solids with resulting clarification and partial purification of the supernatant liquor between stages of digestion, i. e., between active stages and between active and inactive stages. This shifts the major fraction of digester overflow from secondary digesters to an intermediate elutriation system where it is better controlled; (3) Reduces by 25% to 60% the water-to-solids ratio in the liquid contents of the primary digesters destined for storage or continued digestion in subsequent stage digestion tanks. With thin sludges this results in doubling and trebling the amount of solids stored in such subsequent stages; (4) This action not only renders available a larger fraction of the total digestion space for active primary digestion but also saves total primary and secondary digestion space over the disclosures in Patent No. 2,259,688; (5) Aside from materially reducing the alkalinity and biochemical oxygen demand of the digester supernatant and reducing the alkalinity of the final stage digested sludge it renders the final elutriation before sludge filtration more economical in case the sludge is to be dewatered in mechanical filters according to the disclosures of Patents Nos. 1,999,973 and 2,259,688, because; (6) the novel procedures disclosed herein result in using less wash water than in the processing disclosed in Patent No. 2,259,688. Other advantages of our invention will be made clear from the following description and the novel features covered in the claims.

As before stated, the present invention involves, on the one hand, the use of elutriation steps between active and/or active and inactive stages of digestion for the purpose of shrinking the sludge volume and, on the other hand, the use of elutriation on the elutriated product withdrawn from the final inactive digestion stage preparatory to final disposal.

By the term active digestion is meant the high-rate digestion stage or stages where sewage solids are digesting and actively producing sludge gas under proper heat control and seeding with well digested sludge. Active digestion may be carried out in one or more tanks operating in parallel or in series. By inactive digestion is meant secondary or final digestion stages wherein the sludge gas production has become minimized and the well digested product is held in storage. The active and inactive stages are commonly called primary and secondary stages of digestion.

The accompanying drawings are purely diagrammatic and illustrate, by way of typical examples, how our invention can be put into practice.

Figure 4:
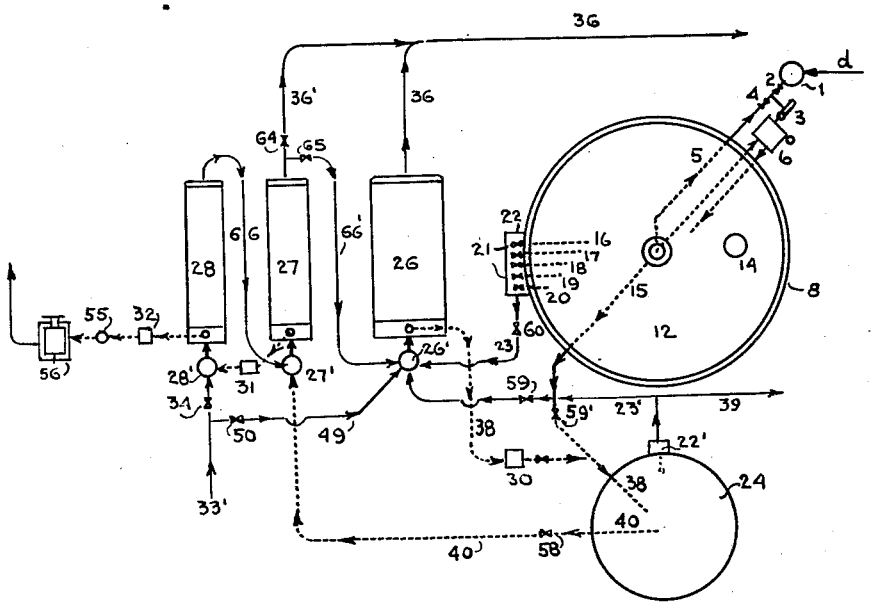
Figure 4 is a diagram in plan showing three tanks necessary for carrying out the purposes of Figure 3 simultaneously with the re-use and conservation of elutriating water.
Figure 5:
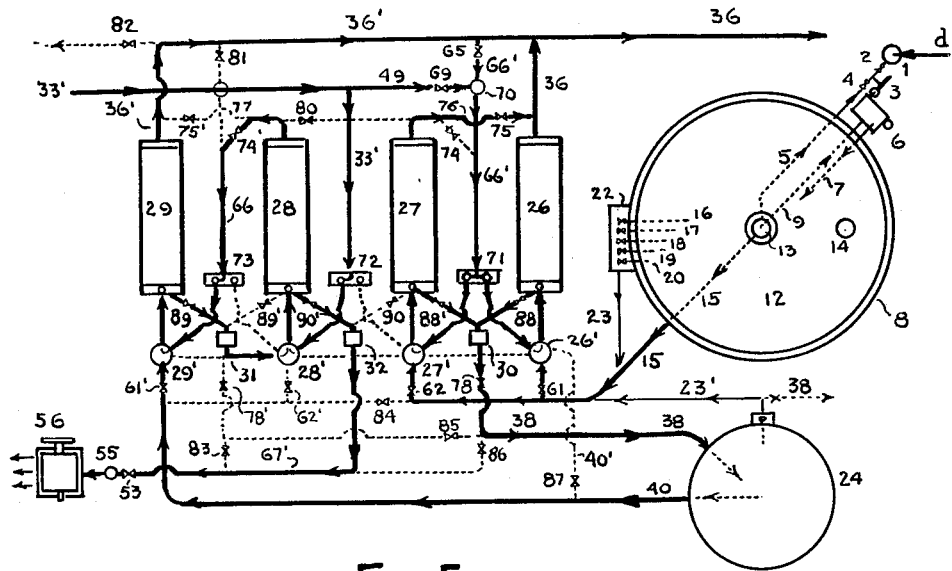
Figure 6:
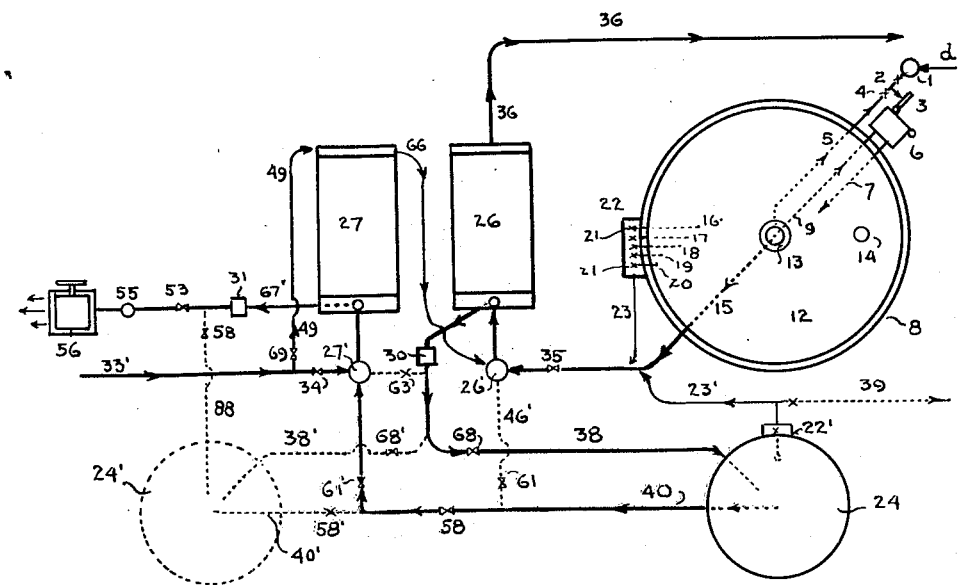

Figure 5 is a further modification of Figure 4 showing four tank compartments for independently and/or simultaneously carrying out single stage elutriation between stages of digestion and two-stage or counter-current elutriation after same with re-use of eluent; and Figure 6 is also a diagram in plan showing first, the use of single-stage elutriation for sludge concentration and alkalinity reduction between digestion stages and next, single-stage elutriation of the concentrated secondary sludge for further alkalinity reduction with re-use of some of the final wash water.

Figure 1:
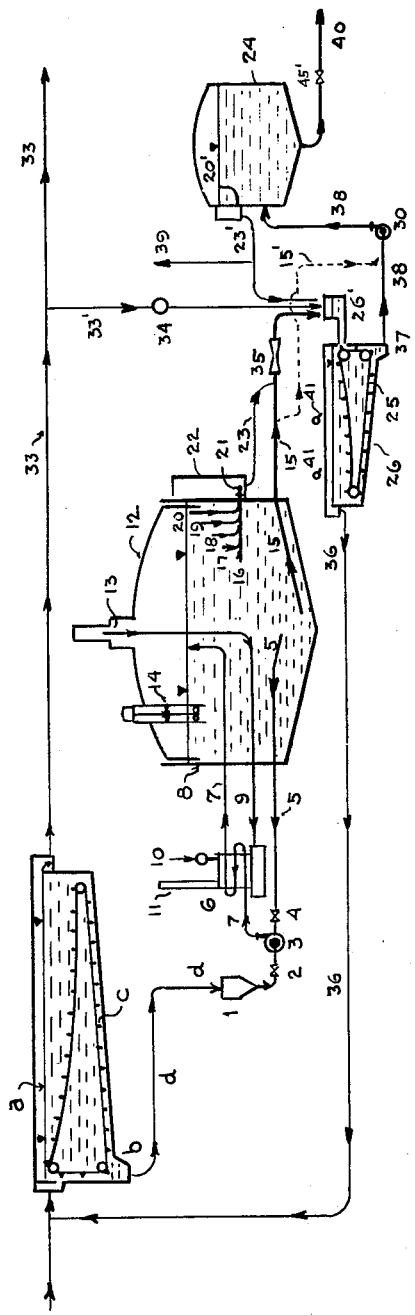
Figure 1 is a diagram of a sludge digestion system in sectional elevation showing the use of our invention in its simplest form between the primary and secondary stages of digestion.

The collection of fresh sludge prior to digestion of same is indicated only in Figure 1 and omitted from Figures 2 to 6, inclusive. In all figures the primary or active stage of digestion is typical of arrangements known to modern art involving gas collection and its utilization for heating the sludge for high-rate digestion.

In Figure 1 the untreated and/or previously treated sewage enters the sedimentation system $a$ where settleable suspended solids are permitted to subside under the action of gravity and the resulting sludge is gathered at $b$ by mechanical sludge collector $c$. Sedimentation tank system $a$ may, therefore, represent either the primary and/or secondary settling basins in primary and/or complete sewage treatment plants and the decantate 33 from same may be, therefore, primary or final plant effluent. The sludge from $a$ is then continuously or intermittently removed through line $d$ and introduced to the digestion system at 1 through pipe and valve 2 and the premixing and recirculating pump 3 where it is premixed and seeded with the proper quality and quantity of well digested sludge drawn through pipe 5 and valve 4 from the primary or active digestion stage 8 and pumped through the digester heater and heat exchanger 6 through pipe 7 into the center of digester 8 at the top liquid level. The heater 6 comprises essentially a gas burner using digestion gas from line 9, with or without the addition of oil fuel, to heat a water bath fed with water through 10. The waste combustion gases exit from stack 11. Pipe 7 carrying the recirculated digested sludge and mixture of same with fresh undigested sludge coils through the hot water bath of heater 6 and becomes heated. The digester 8 is kept at a constant temperature optimum by proper thermostatic and pumping rate controls already known to the art.

The primary or active digester 8 may be equipped with the usual floating cover 12 for gas collection and gas withdrawal at 13, or the cover may be of any other type. Further agitation and circulation of the tank contents in order to provide active digestion and uniform temperature throughout the liquid contents of the tank 8 may be secured with one or several paddle mixers 14. In addition to this, when fresh sludge is not being introduced at 1, valve 2 may be closed and with valve 4 open and pump 3 running, the contents of digester 8 may be recirculated at any desired rate in order to insure keeping the bottom sludge at the same temperature as the rest of the digester contents.

The most completely digested material may be withdrawn for further treatment from the bottom of the digester through pipe 15, while provision may be also made to withdraw dirty sludge liquor at various higher sludge levels through individual pipes 16, 17, 18, 19, 20 etc. and control valves 21 into the sludge liquor collector 22 which has a drain 23. Withdrawals of sludge and mixtures of sludge and liquor through separate pipes 15 to 20 and 23 may be made intermittently or continuously and simultaneously or separately. The chief aim in such a system is to maintain active and vigorous digestion regardless of the character of supernatant sludge liquor withdrawn to collector 22.

In the known art practice dictates that digester 8 be made large enough to permit the withdrawal of relatively clear supernatant from one point near the top level of the liquid contents of the tank. When fresh sludge is pumped into this tank it displaces an equal amount of digested sludge and liquor as hereinbefore mentioned. The displaced liquor, if relatively clear, is returned to the plant primary clarifiers, or, if not too clear, proceeds through 23 together with the sludge withdrawn through 15 to secondary digester 24 which is usually as large as tank 8 in order to permit the slowing down of digestion and to insure the proper separation of clear liquor in the upper tank levels from the more concentrated sludge blanket in the lower tank levels. This action involves a gradual drop in temperature, liberation of some more gas from the slowly digesting solids, hydraulic subsidence of most of the non-gassing solids into a denser sludge and zoning of clarified digester liquor. All of these items require at least two weeks' time and a lot of expensive tank capacity.

Although the secondary digesters commonly known to the art are of simpler construction than the primary digesters, the tank volume is just as large in order to retain, during the two weeks' detention time, the large amount of sludge water and smaller fraction of sludge solids issuing from the primary digestion system. Consequently secondary digestion capacity is quite expensive. This capacity and its cost may be greatly reduced by using our present invention to eliminate most, if not all, of the production of supernatant in secondary digestion while shifting its clarification to an intermediate redilution and solids concentration system shown in Figure 1. This may be conveniently termed an intermediate elutriation procedure. Its use is conducive to high-rate digestion in the primary digesters as it eliminates all necessity of attempting segregation of digested solids and clarified supernatant in these active tanks so that their dimensions may be also materially reduced below the standards of the known art.

In terming this procedure an elutriation step it should be again emphasized that the successive progressive measures involving further dilution with relatively purer water, hydraulic subsidence of the digested solids in the dilute mixture and decantation of the supernatant elutriate have primarily a new function beyond the use of elutriation in Patent No. 1,999,973 and constitute an improvement in the use of elutriation in Patent No. 2,259,688.

To this end the sludge and sludge liquor, regardless of its content of suspended solids, is withdrawn from any or all of the different levels, 15 to 20 inclusive, of the primary digester of Figure 1 and flows intermittently, continuously or at a fairly constant rate during certain intervals, into the mixing end 26' of sedimentation tank 26. In this mixer it is quickly and thoroughly mixed with water of lower alkalinity. This water may be a fraction 33' of the treatment plant effluent 33 or other water from any relatively inexpensive source. It may be metered through any convenient type of device 34 and the sludge and liquor may also be metered at 35 in a Venturi, Parshall flume, weir box or other similar device in order that a fairly constant ratio may be maintained between water and primary digester contents flowing into mixer 26'.

At a dilution ratio of three to five volumes of purer water to one of the combined primary digester sludge and liquor flowing into tank 26 and a detention period or displacement time of about three hours for this dilute mixture in sedimentation tank 26, the hydraulic subsidence of the suspended digested and partially digested solids in this freshly diluted mixture is greatly accelerated over that which takes place in the usual secondary digester and a dilute and relatively clear top water or elutriate is displaced and discarded at 36. At the same time, the subsiding solids settle to a much denser sludge than can be produced in either the primary digester 8 or usual secondary digester 24. In other words, this redilution and sedimentation treatment materially clarifies the digester supernatant and shifts its actual separation from the suspended solids to the elutriation sedimentation tank and materially shrinks the volume of sludge destined for secondary storage. It consequently shrinks the secondary storage space. This action is not contemplated in Patent No. 2,259,688.

The thickened sludge is raked by sludge collecting mechanism 25 to the sedimentation tank sump 37, whence it is continuously or intermittently transferred by pump 30 through pipes 38 to the secondary digester storage tank 24. Using relatively cold water in the elutriation system not only helps subsidence of suspended solids, but practically stops gasification in tank 24. This may permit some further subsidence of solids with a corresponding increase in solids concentration in this tank. In this case a small amount of secondary supernatant may be withdrawn at 20' and 23'. If it is sufficiently clear, it may be returned to plant sewage stream via by-pass 39, or, if somewhat dirty, it may be conducted to the elutriation system as indicated. The final concentrated secondary sludge is withdrawn at 40 for disposal.

Scum-forming aggregates withdrawn from the upper level of the primary digester 8 with the digester liquor may tend to float to the relatively quiescent surface of elutriation sedimentation tank 26. As this surface is usually open and accessible the floating aggregates moving toward overflow 36 are easily wetted by flat-sheet water sprays 41 directed in the opposite direction. This releases entrained gases from the aggregates, wets them and causes them to sink. Particles that are actually lighter than water may be skimmed from the remaining tank space.

In case the sludge withdrawn from the very bottom of the primary digester through pipe 15 is sufficiently heavy at any time, it may be by-passed through (dotted) pipe line 15' directly to pump 30 and tank 24 while the remaining dirty mixture withdrawn from the primary digester at higher levels is given the necessary elutriation concentration treatment in tank 26.

Among the numerous methods used for improving the clarification of primary and secondary digester supernatant that of the aforesaid Genter Patent No. 2,259,688 has demonstrated its value in practice. As before indicated, however, this patent does not describe concentrating solids between active and inactive stages of digestion, although it definitely contemplates clarification of digester supernatant liquor. This patent describes, among numerous elutriation methods, the procedure of utilizing the secondary digester itself for elutriation sedimentation purposes in clarifying the secondary tank supernatant.

Even though this procedure clarifies such supernatant by the action of further dilution of the primary digester products and the production of better solids sedimentation in secondary digestion, it has the disadvantage of depriving this digestion space of storage volume by committing it to sedimentation and sludge concentration. Too much space must be left for the free settling of solids after dilution. Even with a single dilution of the primary digester products relatively large quantities of fresh water must be added to the already highly aqueous first-stage products in order to effect the desired sedimentation and supernatant clarification in the second- or third-stage digester or digesters. For example, in a plant serving 100,000 persons, the total digestion tank space may be 200,000 cubic feet of which 100,000 cubic feet may be used as secondary digestion space. With a combined daily quantity of digested sludge and liquor amounting to 6,650 cubic feet (50,000 gallons) containing 2.7% solids, when one dilutes this with three volumes of water to one of digester mixture, we have a daily quantity of 26,600 cubic feet (almost 200,000 gallons) of diluting water and digester mixture containing 0.675% suspended solids delivered to the second-stage digester for hydraulic subsidence of suspended solids and supernatant decantation. If these solids settle rather rapidly to a bottom sludge containing 6% solids in the second-stage digester, the average solids content of this tank would be $$\frac{0.675+6}{2}=\text{about } 3.34\%$$

This is better solids concentration than that in the primary digester with its average of about 2.7%. However, it can be greatly improved by the present invention, which in this example would permit accumulating and withdrawing from the sump 37 of tank 26 nothing but bottom sludge having 6% solids for storage in the secondary digester 24. In the case of elutriating in the secondary digestion tank, according to Patent No. 2,259,688, the average moisture and solids content of the secondary tank would be 96.66% and 3.34% respectively, which amounts to 29 pounds of water for each pound of dry sludge solids. In the case of using the present invention the sludge transferred from tank 26 to secondary digestion 24 would contain 94% water and 6% solids, which amounts to but 15.7 pounds of water for each pound of stored sludge solids. This is a saving of 13.3 pounds of water for every pound of stored sludge solids which amounts to 46% of the storage space used in carrying out the idea of elutriating in a second-stage digester as mentioned in Patent No. 2,259,688.

Over the balance of the known art our present invention saves considerably more of the expensive space reserved for digestion and segregation of supernatant and digested sludge for the following reasons. Aside from producing a better clarification of the supernatant and thereby eliminating the recirculating solids load, the present invention produces an elutriated sludge containing a higher percentage of solids than usually results in either the sludge withdrawn through pipe 15 from the bottom of primary digester 8 or in the sludge settled out in its own highly fouled digester liquor in the usual secondary digestion tanks. Two typical test examples obtained in well-known plants may be cited. In one installation the digested product delivered to elutriation contains 98.3% water and 1.7% sludge solids, i. e., about 58 pounds of water per pound of digested solids, and after elutriation dilution at 3:1 ratio and two hours, sedimentation in the elutriation tanks the ratio of water to sludge solids in the elutriated sludge is reduced to 96.5% water and 3.5% solids or 27.8 pounds of water per pound of digested solids. This is a volume shrinkage of 52%. In another instance the digester products sent to elutriation show 97.9% water and 2.1% digested solids or 46.5 pounds of water per pound of dry solids. At a 4.5 to 1 dilution ratio with water of lower alkalinity single-stage elutriation and three hours, sedimentation, the concentrated elutriated sludge contained 93.5% water and 6.5% solids or 14.4 pounds of water per pound of stored solids. This procedure removed 69% of the sludge water and shrunk the volume of sludge destined for secondary storage to one third its original magnitude while materially purifying the supernatant.

To this space saving must be added that resulting from eliminating the loss of primary and secondary digester space common to present high-rate digestion practice through recirculating dirty digester supernatant back to plant sedimentation and then to digestion. This loss is sometimes 20% to 25% of the total digestion space. However, limiting this saving effected by our present invention to secondary space and placing it at 50% of the space ordinarily used, for each 100,000 population and 100,000 cubic feet of secondary space exemplified in the previous illustration, the space saving would amount to 50,000 cubic feet. If this space costs installed $1.50 per cubic foot, the saving in construction cost would amount to $75,000. The cost of installing the elutriation system necessary for properly carrying out the intentions of Figure 1 is considerably less than this sum for the following reasons.

As detention time in secondary digestion tanks according to the known art and practice may run from 10 to 15 days in order to secure a reasonably clear supernatant and fair solids concentration, and the detention is efficiently operated elutriation sedimentation tanks needs be but about three hours for obtaining a relatively clear overflow and heavy sludge, it becomes evident that secondary digestion space can amount to twenty-five times that required for concentrating solids in elutriation when both systems operate on the same daily time schedule and a 3:1 dilution ratio is used in elutriation. Consequently, elutriation space is materially cheaper when used for the purposes set forth herein.

The large shrinkage in the volume of digested products leaving primary digestion tanks 8 during treatment in elutriation sedimentation tank or tanks 26 and upon further storage in secondary tank 24 is of further monetary value to the tax payer in the disposal of the final sludge withdrawn through line 40 whether this be by lagooning, further dewatering on said beds or in continuous filters as outlined and intended in Patents Nos. 1,999,973 and 2,259,688, through trucking and spreading of the wet product on farm land, or through disposal at sea which involves barging of the wet product. Secondary tank 24 is of value wherever the concentrated sludge is to be periodically disposed of. It equalizes fluctuations in sludge disposal.

Where the stored sludge may be lagooned for long periods the saving of 25% and 50% of lagooning space is of economic importance. The same observation applies to saving in expensive sand bed areas and space and cargo space and number of truck, railway car and barge loads in transporting the final sludge to the land or sea.

In Figure 1 the concentration of digested solids by elutriation is used essentially between the active and comparatively inactive stages of digestion where there is usually no necessity of heating the secondary inactive stage. Due to shifting the clarification of the digester liquor to the elutriation system the process of digestion in the primary tank or tanks 8 can be pushed readily at a relatively high rate with the result that even this tank may be made smaller than the present state of the known art justifies. This adds further to the saving in digestion space already listed.

Figure 2:
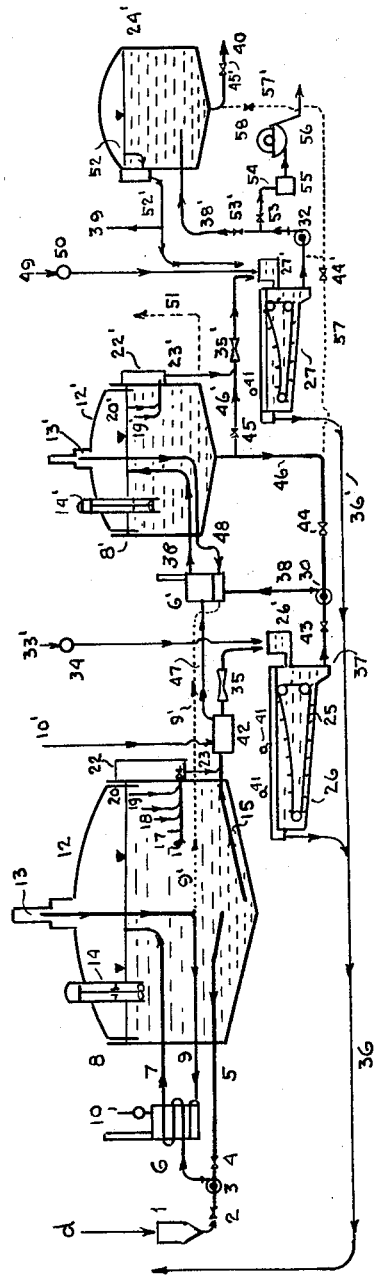
Figure 2 is an extension of Figure 1 showing the use of our invention in series, first between two active stages of digestion and then between the last active and final inactive or storage stage.

In addition to this, if heat is again applied to the secondary digester 24 of Figure 1 in order to cause and hasten some further destruction of organic solids remaining in the concentrated sludge, it also becomes an active digestion tank and the first digester 8 may be made smaller still in order to produce high-rate digestion. Figure 2 shows how elutriation then becomes useful between two active stages of digestion before it may be used again for further final shrinkage of sludge volume.

If the procedure disclosed in Figure 1 shrinks the volume of the digester products leaving the primary digester 8 to one half its volume before pumping the concentrated sludge to tank 24, it also reduces by 50% the heat requirements for bringing the concentrated sludge back up to the temperature optimum for renewed active digestion in tank 24. In Figure 2 active digestion takes place in two stages in series in tanks 8 and 8' with heat applied to both stages. What was secondary stage 24 in Figure 1 now becomes the second series step 8' in primary or active digestion. Tank 8 will be smaller than in the Figure 1 arrangement due to shortened detention time therein. At the same temperature optimum as used in the procedure disclosed in Figure 1 and with vigorous recirculation of the contents of tank 8 in Figure 2 there will be somewhat less destruction of organic matter in this initial stage digester. However, solids concentration and sludge volume shrinkage again takes place in the digested or partially digested products sent through the elutriation settling tank 26. This materially diminishes the volume of tank 8' required for completing active digestion.

In Figure 2 the incompletely digested solids with digester liquor proceeding from tank 8 are cooled by heat transfer in heat exchanger 42, metered at 35, diluted with water from line meter 34 and line 33' and thickened with scum removal in the elutriation system and sedimentation tank 26 as previously described. Clarified top water 36 overflowing sedimentation tank 26 is described. Concentrated incompletely digested sludge is transferred from sump 37 by pump 30 through reheater 6' to the second active digester 8' through line 38.

When concentrated sludge is not being transferred from elutriation sedimentation tank 26 and its sump 37 to digester 8' valves 43 and 45 are closed and with valve 44 on line 46 open and pump 30 running the contents of active digester 8' may be actively recirculated through reheater 6', and heated in a manner similar to the procedure used for heating the contents of tank 8.

In order to conserve heat in re-establishing optimum temperature for completing digestion in tank 8' the warm sludge and liquor drawn from tank 8 through lines 15 and 23 can pass through coils or baffles in a heat exchanger 42 containing a water bath fed by water line 19'. The water therein becomes warm and flows through line 47 to reheater 6' which is essentially similar to original heater 6. Reheater 6' derives fuel for requisite additional heating from the gas evolved in tank 8' conducted to the burner 6' through gas line 48. If any additional gas is required it may be taken from the dotted branch 9' of line 9 originating in tank 8.

With further destruction of the organic fraction of the solids introduced in the concentrated sludge to the second tank 8' there will again be a reduction in the size of elutriation tank 27 used to wash and concentrate the solids leaving this tank and in the quantity of wash water 49 metered through 50. Also with the further reduction of organic solids through active digestion in tank 8' the percentage of sludge solids will again diminish and some supernatant liquor may be removed at 19' and 20' to collector 22' and line 23'. If it is relatively clear, it may be discarded through dotted line 51 and the more concentrated bottom sludge sent through line 46 and dotted line 57 with its valve 44' to pump 32 for storage in secondary tank 24'. This tank may not be necessary in some cases but in others it will be useful if the final sludge is to be disposed of at various seasons or other time intervals by spreading on land, sand beds, transportation to distant localities by trucking, railroading or barging. For reasons already disclosed its capacity will be smaller than the present known art requires. If any further solids concentration results by renewed detention under quiescent storage conditions in this tank, supernatant liquor can be decanted at 52 and diverted through line 39 or subjected to elutriation for proper clarification.

In fact, the entire contents withdrawn from active digester 8' through lines 46' and 23' may be again subjected to further elutriation concentration in tank 27 by metering at 35', mixing in tank 27' with metered water from line 49 and resettling in tank 27. The top water overflowing this tank at 36' may be united with overflow 36 from tank 26 or reused for elutriation in this tank as hereinafter provided.

The concentrated elutriated sludge leaving final elutriation concentration tank 27 may by-pass tank 24' and proceed directly through valves 53 and line 54 to a chemical coagulating mixer 55 and thence to continuous filter 56 for further dewatering and disposal, or the concentrated sludge may be stored in tank 24' for purposes already indicated and in case the filter 56 is operated but a fraction of the daily and weekly time. In this case valve 45' on line 49 is closed and the stored secondary sludge passes from tank 24' through valve 58 and dotted line 57' to pump 32 and the filter 56. If the washed solids collected in tank 27 are filtered directly without secondary storage this elutriation tank will act essentially in the sense covered by Patent No. 1,999,973. However, when a portion or all of the elutriate overflowing this tank at 36' is used for dilution and sedimentation in the elutriation concentration system of tank 26 between stages of digestion as hereinafter provided, novel economies in the use of diluting water in connection with the present invention will result.

Whereas the arrangements disclosed in diagrams of Figures 1 and 2 are intentionally used between various stages of digestion for the purpose of shrinking the sludge volume and lessening the detention time in digestion as well as for clarifying the digester liquor and reducing its biochemical oxygen demand and alkalinity, the diagrammatic arrangements shown in plan in Figures 3, 4, 5 and 6 are, likewise, intended to be used for the same purpose plus those incidental to preparing the stored secondary digested sludge for mechanical filtration. The same elutriation tank system may be arranged so as to serve for both purposes.

Figure 3:
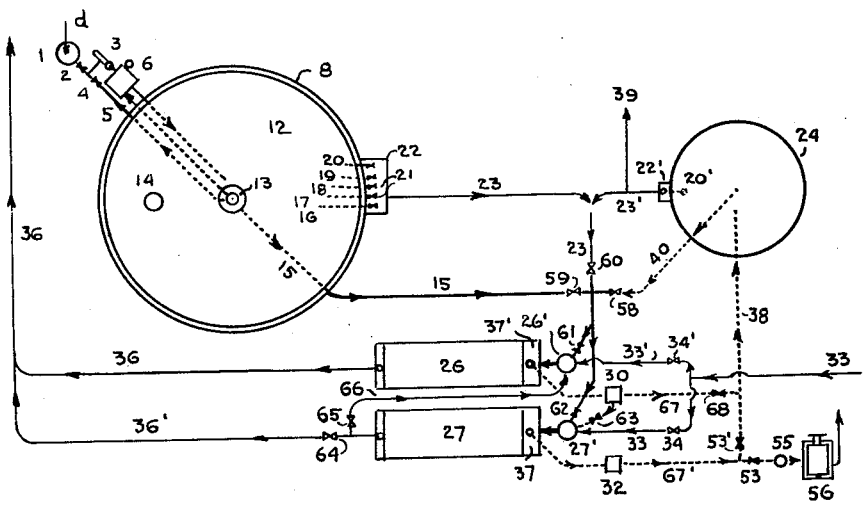
Figure 3 is a diagram in plan showing the use of dual elutriation tanks, first in parallel for single-stage elutriation and solids concentration between active and inactive stages of digestion during one period of each operating day which is then followed by using the same tank system in counter-current series for elutriation prior to continuous filtration of the sludge from the inactive stage.

The tank arrangement diagrammed in Figure 3 is adapted to digestion installations using continuous filters from about 15% to 33% of the total weekly 168 hours of available time, i. e., from about five hours daily and five days weekly to eight hours daily and seven days weekly. Such periodic operating schedules are common practice with installations employing sludge digestion without the employment of sludge cake heat driers and incinerators after continuous mechanical filtration. In using elutriation in such installations for purposes set forth in Patents Nos. 1,999,973 and 2,259,688 the same tank system may be used to gain the additional novel economic advantages disclosed in the present invention while further improving the advantages aimed at in the aforesaid patents. Such a use necessitates changes in the piping system and methods of operating.

In Figure 3 two elutriation tanks, or a single tank having companion compartments 26 and 27 are provided. They are so arranged that during the major portion of a day or week they operate in parallel as a single tank using single-stage elutriation between stages of digestion as described with reference to Figure 1. Then during the shorter intervals of the days when the continuous filters are used for further dewatering of the stored concentrated secondary digester sludge they operate not in parallel but in two-stage series. This method of operation materially extends the purposes and economies disclosed in Patents Nos. 1,999,973 and 2,259,688 while saving a large amount of digester tank space over the present known art.

Properly applied single-stage elutriation, i. e., a single dilution with clean eluent, hydraulic subsidence of the washed solids and decantation of clarified elutriate will produce excellent concentration of solids in the elutriated sludge and a supernatant elutriate overflow containing less suspended solids than will two successive elutriation operations. This is the chief reason for using single-stage elutriation between digestion stages.

Sewage treatment plants handling domestic sewage receive most of the plant loading during the day time. Depending on the size of the plant and its location relative to the district served, the flow is generally at a maximum between 7 a. m. and noon. From early afternoon on it usually diminishes and reaches a minimum sometime after midnight. During the peak loading hours and for some time thereafter it may be desirable to accumulate fresh sludge in the plant plain sedimentation tanks. As there will then be no necessity for pumping this sludge to primary digestion the elutriation system may be used for washing the stored secondary digested sludge preparatory to continuous filtration. Then during the off-peak hours the elutriation system will be put into use for single-stage concentration of sludge solids between digestion stages because during this time the well thickened fresh solids collected in the various plain sedimentation tanks may be transferred to the primary digestion units. Or in case it may be desirable to transfer the fresh sludge to digestion during the peak loading hours the foregoing procedure may be reversed.

When single-stage elutriation is to be used on the sludge and supernatant transferred from the primary stage of digestion 8 in Figure 3 the following valves in the piping system are closed, sludge valves Nos. 53, 58, 63 and elutriate valve 65, while the following valves are open, sludge valves 59, on line 15, 60 on line 23, 61, 62, 53', 68, water valves 34 and 34' on lines 33 and 33', elutriate valve 64. With transfer pumps 30 and 32 and mixers 26' and 27' running, primary digester products flow through valves 59, 60, 61, 62 into mixers 26' and 27' where they are diluted and mixed with clean water entering through flow regulating valves 34 and 34' of the branches 33 and 33' of the water main 33. As valves 59, 60, 34 and 34' are preferably of the flow metering and regulating type, both the material leaving primary digester 8 and the diluting water flows are divided into approximately equal halves so the displacement time through elutriation settling tanks 26 and 27 is double what it would be if the same mixture of sludge and diluting water were conducted first through tank 26 and then through tank 27. This parallel single-stage dilution and sedimentation treatment allows ample time for hydraulic subsidence of the washed sludge solids into a heavy sludge and the production of overflow elutriate at 36 and 36' relatively free of suspended digested solids.

The heavy sludge simultaneously collected in sedimentation tanks 26 and 27 is transferred from the tank sumps 37 and 37' by transfer pumps 30 and 32 through open valves 53' and 68 and pipe 38 to secondary digester 24 for storage. If any further concentration of solids occurs in this tank the supernatant withdrawn at 20' is routed as already described with reference to Figures 1 and 2. As the major portion of the fouled water leaving primary digester 8 will be removed in the single-stage elutriation step between stages of digestion, there will be relatively little supernatant produced in the secondary tank 24.

In changing the elutriation tank and valve systems for the removal of the fouled liquor left in the sludge stored in secondary digestion in preparation to chemical dosing and further dewatering in continuous filters the following valves are closed: sludge valves 59, 60, 62, 53', 68, water valve 34' and elutriate valve 64. The following valves are then opened: sludge valves 58, 61, 63, water valve 34 and elutriate valve 65. Water takes its course from line 33 through open meter valve 34, through mixer 27', filling tank 27, overflowing same, passing through valve 65 and line 66, into and through mixer 26', into tank 26 and overflowing same at 36. Sludge from secondary storage 24 takes the opposite direction. With pumps 30 and 32 and mixers 26' and 27' running, sludge flows from tank 24 through line 40, valves 58 and 61 into the first mixer 26' where it is diluted thoroughly with water from line 66 overflowing tank 27. After proper concentration and collection in tank 26 transfer pump 30 moves this sludge through open valve 63 to mixer 27' where it is rediluted and mixed a second time. This occurs with fresh water entering the system through open meter valve 34. The washed solids again subside to a concentrated sludge which is transferred from sump 37 of tank 27 by pump 32 through regulating valve 53 which is opened when pump 32 is started, permitting sludge delivery to the chemical dosing mixer 55 where it is dosed with coagulant and fed to continuous filter 56 for further dewatering. The elutriate overflowing tank 27 is but weakly fouled by the decomposition solutes left in the sludge that has already received a preliminary wash in tank 26, consequently it is reused for washing purposes in this tank 26.

This countercurrent elutriation requires the least amount of initial diluting water to extract the maximum amount of inimical solute from the sludge entering the system. Because the sludge volume stored in secondary tank 24 by the single-stage procedure used on the primary digester products is but about one half the volume of those diluted products passing through the two elutriation tanks in parallel single-stage, it can now be passed back through these tanks in series with a smaller total volume of diluting water and with a detention period in each tank fully equal to that used in the initial single-stage procedure.

All of this results in the following important economies:

(1) The mere concentration of solids without changing the chemical nature of the fouled sludge water automatically reduces the ratio of fouling solute to suspended solids present. However, in this case the first single-stage elutriation with water purer than the fouled sludge moisture plus the effect of producing a greater concentration of solids in the purer water mixture combine to compound this reduction in ratio of fouling solute to sludge solids. In most cases this single-stage dilution at a 3:1 dilution ratio, combined with solids concentration, reduces the percentage of inimical solute present on solids to one sixth or less of its original value.

(2) The compacted sludge stored in tank 24 may now be rediluted at the same ratio of water to sludge moisture by using far less water than originally used and the solids may be again settled out in half the total tank space.

(3) This permits using the two separate elutriation tanks 26 and 27 as elutriation units in series to reduce the remaining inimical solute to an economic minimum.

(4) By using tanks 26 and 27 first in single-stage between the active and inactive stages of digestion then in countercurrent series after digestion we not only save digestion space but gain new economies in elutriation tank space and total water consumption while obtaining a maximum reduction of the inimical solute resulting from the sludge digestion process. All of these economies combine to advance the art of solids disposal beyond the disclosures of Patents Nos. 1,999,973 and 2,259,688.

The fouling of sludge water by inimical biochemical solute through sludge digestion is now measured in parts per million of alkalinity calculated as $CaCO_3$. This results from the accumulation of ammonium bicarbonate and other biochemical solutes during anaerobic digestion. Usually the alkalinity of sludge water leaving the primary digestion stage is about 2500 parts per million. In a digested product of 98% of this water and 2% solids leaving primary digesters, this would mean $$\frac{98}{2} \times 0.25$$

or 12.25% alkalinity on solids. Concentrating this product without the benefits of elutriation to 96% fouled water of the same alkalinity and 4% solids means cutting the foregoing percentage in half, i. e., $$\frac{96}{4} \times 0.25 = 6\%$$

alkalinity on solids. However, if the digested product were diluted in three volumes of plant effluent of 100 parts per million alkalinity per volume of original sludge water the alkalinity by dilution would be reduced to 700 parts per million. Then, if the solids subsided in this dilute solution to a sludge containing 95% water and 5% solids, the results would be $$\frac{95}{5} \times 0.07 = 1.33\%$$

alkalinity on solids. This is only about one-ninth the original fouling value and represents what the first single-stage elutriation between digestion stages accomplishes in shrinking the volume for secondary storage.

If this secondary sludge were then elutriated at a ratio of two volumes of plant effluent to one of sludge moisture by countercurrent series in the two tanks, as already described, the alkalinity of the sludge leaving tank 27 would be 185 parts per million, which with 95% water and 5% solids would amount to 0.35% alkalinity on solids. This is one-thirty-fifth, or less than 3% of the original value. The total amount of diluting water used for each volume of original sludge moisture amounts to 3.78, i. e., the original sludge moisture amounted to 49 pounds per pound of solids to which we added three times 49 pounds or 147 pounds of water. To the secondary sludge containing 19 pounds water per pound of solids we added 2 times 19 or 38 pounds of water, making the total 185 pounds of water for each pound of solids. This amounts to 3.78 times the original 49 pounds of water. To get the original primary digester product of 98% fouled water down to 185 parts per million by countercurrent in two tanks according to Patents Nos. 1,999,973 or 2,259,688 requires a water ratio of 4.75 for each pound of original sludge water. This is 20.5% more water than the foregoing amount. Furthermore, the elutriation tank capacity would have to be greater than that of diagram in Figure 3 in order to provide for two successive washes of the same total dilute mixture of sludge and water. What is most important in this comparison there would be no reduction in costly secondary digestion space.

As before stated, the arrangement shown in Figure 3 is adapted to plants using continuous filters during a third or less of the total weekly operating time. In operating on such a schedule the elutriation system has to be three times larger than necessary for full time operation. In the latter case the rate of flow through the elutriation system will be but one-third of that required to handle a day's digester output in eight hours. Elutriation tank- and filter-capacity requirements become correspondingly smaller. However, in this case the scheme shown in Figure 3 cannot be employed because the two uses to which elutriation is put must operate frequently simultaneously in independent tank systems.

To this end the layouts in Figures 4, 5 and 6 are devised. Here all elutriation tanks become smaller even though there are more of them. Due to the fact the final sludge solid washing operations prior to continuous filtration and the elutriation operation between stages of digestion operate simultaneously further economies in water consumption result, meaning that some of the water used for final countercurrent elutriation can be carried over to valuable use in the initial sludge concentration system.

In Figure 4 with valve 59' between primary and secondary digestion closed and all other valves open, primary digester sludge and dirty liquor flow through lines 15 and 23 to mixer 26' where they are diluted and mixed with purer water entering from branch line 49 through flow metering valve 50. The diluted mixture flowing into settling tank 26 produces the heavy sludge as already described. This is transferred through dotted line 38 by pump 30 to secondary storage 24.

The concentrated secondary sludge then proceeds through line 40 with its valve and rate controller 58 to countercurrent elutriation in two tank compartments 27 and 28 each having about half the contents of tank 26 and both being connected in series and operated in countercurrent as already described in diagram of Figure 3. All operations in tanks 26, 27 and 28 of Figure 4 are similar to those of Figure 3 excepting that they usually proceed independently and/or simultaneously. This makes it possible to effect further economy in the use of wash water as all three tanks may be put in countercurrent with secondary storage of concentrated digested sludge placed between tank 26 and its immediate successor 27.

Due to the greatly diminished volume of the secondary digester sludge and its lowered alkalinity concentration, there will be, as previously demonstrated, less water required at metering valve 34 to wash it. Also, the final elutriate leaving tank 27 at 36' will be relatively weak and all or any fraction thereof may be diverted for reuse in solids concentration in the larger tank 26. If all of it is diverted to mixer 26' and tank 26 through line 66' the washing ratio for final alkalinity reduction in tank 28 may be increased to what is convenient for solids concentration in tank 26. If the final alkalinity of the sludge moisture leaving secondary tank 24 is low enough to warrant but a 2:1 or 3:1 wash water ratio in countercurrent flow through tanks 27 and 28 in order to obtain a longer detention period therein for good clarification of overflows 66 and 66', fresh water in any desired quantity may be added through branch line 49 of the main water line 33' to the portion of elutriate 66' entering mixer 26' and tank 26.

If elutriate 36' overflowing tank 27 is relatively dirty, it will be advantageous to treat it like dirty digester supernatant and return it all through line 66' to mixer 26' where it may be further diluted with fresh water from branch 49. This provides extra insurance of removing most of the suspended solids in elutriate 66', as well as in those entering the single-stage elutriation system from digester 8 while concentrating the settleable solids in tank 26.

When concentrated sludge is not being withdrawn from secondary digester 24 to final elutriation in tanks 27 and 28 the single-stage elutriation tank 26 will operate between digestion stages 8 and 24 as shown in Figure 1.

When longitudinal or square tank structures are used for elutriation sedimentation, tanks 26, 27 and 28 will be normally one structure with two dividing walls to form the three separate units shown. As tank 26 is usually equal in surface area and capacity to the combined surface areas and capacities of tanks 27 and 28 it may be equipped also with a dividing wall to form two separate tank compartments 26 and 27, as shown in Figure 5. These first two compartments or tanks may be then used in parallel for single-stage elutriation, solids concentration and supernatant clarification between stages of digestion, as already described in reference to Figures 3 and 4 and tanks 28 and 29 may be used either in parallel single-stage or in sequence for final two-stage elutriation of the secondary sludge prior to dewatering same in continuous filters.

In this case the piping may be so arranged that any number of compartments may be used for parallel single-stage elutriation purposes and the remaining also for single-stage, the former being in series with the latter, if desired.

In the flow diagram of Figure 5 the full-line flow indicates the course taken when tanks 26 and 27 are used in parallel for single-stage supernatant clarification and solids concentration between the primary and secondary stages of digestion 8 and 24, while tanks 28 and 29 are used in countercurrent series between secondary digestion 24 and the continuous filtration 56 with reuse of final elutriate from tank 29 for the initial dilution and solids concentration stages. In this full line course the primary digester products from active digester 8 flow through lines 15, 23 and are approximately evenly divided by flow metering valves 61 and 62 and enter mixers 26' and 27' in parallel streams which are diluted at any desired ratio with water from line 66', which as already indicated with reference to Figure 4, may be fresh water from branch line 49 with and without admixed elutriate from final tanks 28 and 29. The diluting water flow is also evenly divided in three-way channel or valve 71 to permit parallel or approximately equal flows into mixers 26' and 27'. The diluted sludge-water mixture flows in parallel into tanks 26 and 27 wherein the solids settle and the clearer top elutriate exits from the system through lines 76 and 36 as hereinbefore described. The collected concentrated sludge is removed from tanks 26 and 27 by transfer pump or pumps 30 through line 38 to storage in secondary digestion 24. The sludge from this tank flows through line 40 to countercurrent washing in tanks 28 and 29. It flows first to mixer 29' where it is diluted with supernatant elutriate 66 from tank 28 which is properly diverted in three-way channel or valve 73, as indicated by the full-line arrows. The supernatant elutriate from tank 29 overflows, as shown at 36'. The collected sludge is transferred by pump 31 to mixer 28' where it is diluted and mixed with fresh water 33' flowing through three-way channel 72 as indicated by full-line arrows. The overflowing elutriate 66 is reused for dilution and solids washing in tank 29 as already indicated. The settled sludge collected in tank 28 is transferred by pump 32 through line 67' to chemical coagulation 55 and continuous filters 56.

The dotted lines with their valves shown between the full-line flows and various tanks in the elutriation diagram of Figure 5 indicate how the foregoing methods may be carried out in various tank pairs or other parallel or series groupings to effect various degrees of concentration of solids between stages of digestion, various economies in the use of elutriating water and various degrees of removal of the original fouled sludge liquor from the sludge solids.

For example, by closing the full-flow-line valves 61, 62, 65, 74', 75, 78, 88' and 90' and opening valves 61', 62', 74, 75', 78', 81, 82, 85, 87, 89' and 90 and shifting the three-way channels 71 to give single flow to mixer 26', 73 to give equally divided flow to mixers 28' and 29' and setting pump 31 to deliver sludge through valves 78' and 85 to line 38 and digester 24, single-stage elutriation in parallel will take place in tanks 28 and 29 between digesters 8 and 24 with pump 31 delivering concentrated sludge to tank 24. Following this, countercurrent elutriation in series will take place in tanks 26 and 27, and pump 32 will continue to deliver well elutriated sludge to the continuous filters.

Likewise with tanks 26—27 paired as shown for parallel, single-stage concentration of solids between digestion stages, tanks 28—29 may be paired similarly for single-stage elutriation between secondary digestion and continuous filtration. With this arrangement each pair of tanks, operating in parallel as one unit, may be said to be used in two sequent steps with secondary digestion located between the two steps. Being used in such series on the same sludge solids they may operate either in a two-stage sequence with fresh water used for each dilution or in a truer countercurrent manner involving the use of some or all of the weak elutriate from the final sludge elutriation with or without the addition of fresh water for the initial solids concentration and clarification of digester supernatant between digestion stages. The same argument applies to the use of three of the tanks, or tank compartments, shown in Figure 5 for parallel, single-stage purposes between stages of digestion and the remaining single tank for single-stage elutriation between secondary digestion and continuous filtration.

This is similar to the simpler arrangement shown in the diagram of Figure 6. Here each of the tanks 26 and 27 act as pairs 26—27 and 28—29 in Figure 5 when each pair operates as a single unit. In the full-line diagram of Figure 6 tank 26 concentrates digested solids by single-stage elutriation between the primary and secondary stages of digestion, 8 and 24, and provides for storing the concentrated sludge in tank 24. This sludge is then given another single-stage elutriation treatment in tank 27 where fresh water primarily enters the elutriation system. The elutriate overflowing tank 27 is then re-used, with or without the addition of more fresh water, for solids concentration in the first elutriation sedimentation tank 26. It is, therefore, used in countercurrent with the sludge solids being treated in the two tanks 26 and 27 with secondary digestion inserted between these tanks.

The two-tank elutriation system may be also placed in countercurrent with an active stage of digestion between the two as described in connection with Figure 2. This involves reheating the sludge stored in tank 24 after concentration in tank 26, as indicated in Figure 2, then conducting this sludge through elutriation in tank 27 to the final secondary digester 24', shown in the dotted circle of Figure 6, instead of directly to the continuous filters.

To this end sludge and/or sludge liquor from the first active digester 8 proceeds as already described through the elutriation concentration tank 26 to pump 30 and line 38 to tank 24 where digestion is purposely continued. The more completely digested material from this tank then may be reconcentrated by elutriation and transferred to secondary storage by two or more methods. For example, when operating on an alternate schedule as mentioned in describing Figure 3, elutriation tank 26 may be first used for shrinking the volume of sludge between active stages of digestion and then used again for reconcentration of tank 24 by closing valves 35 on line 15, 68 on line 38, 58 on line 40 and opening valves 61 on dotted line 46', 68' on dotted line 38' and 61' on line 40. The more completely digested product leaving tank 24 will flow again through elutriation system 26, become concentrated and transferred by pump 30 through valve 68' and line 38' to storage in tank 24'. For final washing it will then proceed to the redilution and resedimentation system of tank 27 through dotted line 40' and open valves 58' and 61'. From tank 27 the collected sludge proceeds to continuous filtration as already shown. Or, in case operations in all digestion and elutriation tanks are carried out substantially concurrently and tank 26 can be used only for concentrating digester products between active stages of digestion for storage in tank 24, with valves 35, 68, 58' open and valves 61, 68' on dotted lines 46' and 38' closed so tank 26 operates to concentrate solids between digesters 8 and 24, sludge from digester 24 may be routed through the elutriation system 27', 27 to storage 24' and continuous filters with tank 24' floating on the filter feed line 67' by regulating valve 53 and transferring any desired quantity of surplus sludge from tank 27 through dotted line 88 and open valve 58 to storage 24'.

The essential novelty in such combinations lies in using the elutriation systems in at least two separate sequent steps with some stage of digestion, active or inactive, between these steps and with the flow of diluting water in the system countercurrent to the flow of the digested solids.

In any and all of the accompanying diagrams tanks 8, 24 and 24' may be but one of each in smaller plants and various multiples in larger installations. Although the optimum temperature zone for high-rate digestion has been placed herein at about 100° F., which is commonly termed the mesophillic range, the present invention may be used effectively also for the concentration of sludge solids that have been subjected in primary digestion to the higher or thermophillic temperature range.

Regardless of the manner of disposing of the final, concentrated digested sludge, whether by lagooning, flooding on land, spreading on sand beds, dumping at sea or dewatering in continuous filters it will be seen from the foregoing that sludge digestion in combination with our present invention materially improves the economies of the present known art of sludge disposal.

We claim:

1. In a sewage treatment system having partial dewatering of fresh sewage solids by plain sedimentation, diminution of the quantity of said solids by anaerobic digestion operating in separate primary and secondary stages followed by further dewatering of the digested solids in mechanical filters, the process of at least twice increasing and decreasing the ratio of water to sludge solids which comprises increasing said ratio by active primary digestion of the organic fraction of the fresh solids delivered to digestion, withdrawing liquid digestion products from the primary stage, further increasing said ratio by diluting said products with water purer than the biochemically fouled digester liquor contained in said products, reconcentration of the settleable solids in a special settling basin, decantation of the supernatant water therefrom, discarding of same, delivery of the concentrated solids to the secondary digestion stage, withdrawing liquid digestion products from the secondary digestion stage and repeatedly treating the settleable solids in said products by dilution and sedimentation in at least two separate settling basins operating in series so that water purer than the liquor contained in said products is used for final dilution and produces a decantate in the final settling basin which is recirculated back for diluting the liquid products fed from the secondary digestion stage to the preceding settling basin of said series, delivery of all or any fraction of the decantate from this settling basin to the initial water dilution and solids sedimentation step between the primary and secondary stages of digestion, delivery of the decantate from this initial basin to the sewage stream, and delivery of the final, reconcentrated digester solids to mechanical filtration equipment for further dewatering.

2. In a sewage treatment system, sedimentation basin equipment for collecting settleable sewage solids and decanting water from same, a separate sludge digestion and solids concentration system having associated therewith a primary digestion chamber receiving sludge from the sedimentation basin and sludge heating and gas collecting equipment for keeping the digestion process biologically active, an elutriation dilution, sedimentation and elutriate decantation system, receiving liquid products from the primary digester mixed with diluting water, and a secondary digestion chamber receiving concentrated sludge from the elutriation sedimentation system, means for conducting fresh sludge from the sedimentation equipment to the heated primary digester, means for conducting liquid digestion products from the primary digester to the elutriation system, means for diluting said products with water purer than the biochemically fouled liquid digestion products, means for collecting the settleable solids and for freeing same by decantation from a major fraction of the dilute liquor prior to passage of the concentrated elutriated sludge to the secondary digester and to final disposal.

3. In a sewage treatment system, sedimentation basin equipment for collecting settleable sewage solids and decanting water from same, a separate sludge digestion and solids concentration system having associated therewith a primary digestion chamber receiving sludge from the sedimentation basin and sludge heating and gas collecting equipment for keeping the digestion process biologically active, an elutriation dilution, sedimentation and elutriate decantation system, receiving liquid products from the primary digester mixed with diluting water, and a secondary digestion chamber receiving concentrated sludge from the elutriation sedimentation system, means for conducting fresh sludge from the sedimentation equipment to the heated primary digester, means for conducting liquid digestion products from the primary digester to the elutriation system, means for diluting said products with water purer than the biochemically fouled liquid digestion products, means for collecting the settleable solids and for freeing same by decantation from a major fraction of the excess dilute liquor prior to passage of the concentrated elutriated sludge to the secondary digester, and means for freeing the sludge in the secondary digester from a further fraction of excess sludge liquor prior to final disposal.

4. In a sewage treatment system, sedimentation basin equipment for collecting settleable sewage solids and decanting water from same, a separate multistage digestion and solids concentration system having associated therewith at least two primary digesters one of which receives sludge from the sedimentation equipment and both of which have sludge heating and gas collecting equipment for keeping the digestion process biologically active, an elutriation dilution, sedimentation and elutriate decantation system, receiving liquid products from one of the digesters mixed with diluting water, and a second active digestion chamber receiving concentrated partially digested sludge from the elutriation sedimentation system, means for conducting sludge from the sedimentation equipment to the heated digesters, means for conducting liquid digestion products from one of the heated digesters to the elutriation system, means for diluting said products with water purer than the biochemically fouled digestion products, means for collecting settleable solids and for freeing same by decantation from excess diluted liquor prior to passage of the concentrated elutriated sludge to the following digester, means for reheating the elutriated sludge in this digester.

5. In a sewage treatment system, sedimentation basin equipment for collecting settleable sewage solids and decanting water from same, a separate multistage digestion and solids concentration system having associated therewith at least two primary digesters one of which receives sludge from the sedimentation equipment and both of which have sludge heating and gas collecting equipment for keeping the digestion process biologically active, an elutriation dilution, sedimentation and elutriate decantation system, receiving liquid products from one of the digesters mixed with diluting water, and a second active digestion chamber receiving concentrated partially digested sludge from the elutriation sedimentation system, a second elutriation dilution, sedimentation and elutriate decantation system receiving liquid digestion products from the secondary heated digester mixed with diluting water, and a final digestion chamber receiving concentrated sludge from the second elutriation sedimentation system, means for conducting fresh sludge from the sedimentation equipment to the first heated digester, means for conducting liquid digestion products from this digester to the primary elutriation system, means for diluting said products with water purer than the biochemically fouled digestion products, means for collecting the settleable solids and for freeing same by decantation from a major fraction of the excess dilute liquor prior to passage of the concentrated elutriated sludge to the following digester, means for reheating the elutriated sludge in this digester, means for conducting liquid digestion products from this secondary heated digester to the secondary elutriation system, means for diluting said products with water purer than the water associated with the secondary digester solids, means for collecting settleable solids and for freeing same by decantation from the excess diluted liquor prior to passage of the final concentrated elutriated sludge to final sludge storage prior to delivery of the stored sludge to final disposal.

6. In a sewage treatment plant a sedimentation basin for collecting settleable sewage solids and decanting water from same, and a solids destruction and dewatering system having associated therewith a primary heated digester receiving settled sludge from the sedimentation basin, a primary elutriation dilution, sedimentation and elutriate decantation tank system receiving liquid products from the primary digester mixed with diluting water, a secondary digester receiving concentrated sludge from the primary elutriation system, a secondary elutriation dilution, sedimentation and elutriate decantation tank system receiving liquid products from the secondary digester, and a mechanical filtration system for receiving and further dewatering the sludge from the secondary elutriation system, means for conducting fresh sludge from the sedimentation basin to the heated primary digester, means for conducting liquid digestion products from the primary digester to the primary elutriation system, means for diluting said products with water purer than the biochemically fouled liquid digestion products contained therein, means for collecting the settleable solids from the dilute mixture and for freeing same by decantation from a major fraction of excess dilute liquor in the primary elutriation settling tank, means for transferring the concentrated, elutriated sludge to the secondary digester, means for conducting the sludge products from this digester to the secondary elutriation system, means for diluting said products with water purer than the liquid fraction of said products, means for collecting the settleable solids and for freeing same by decantation from a major fraction of the excess dilute liquor in the secondary elutriation settling tank and means for delivering the concentrated sludge from this tank to a mechanical filtration system for further dewatering.

7. In a sewage treatment plant a sedimentation basin for collecting settleable sewage solids and decanting water from same, and a solids destruction and dewatering system having associated therewith a primary heated digester receiving settled sludge from the sedimentation basin, a primary elutriation dilution, sedimentation and elutriate decantation tank system receiving liquid products from the primary digester mixed with diluting water, a secondary digester receiving concentrated sludge from the primary elutriation system, a secondary elutriation dilution, sedimentation and elutriate decantation tank system receiving liquid products from the secondary digester, and a mechanical filtration system for receiving and further dewatering the sludge from the secondary elutriation system, means for conducting fresh sludge from the sedimentation basin to the heated primary digester, means for conducting liquid digestion products from the primary digester to the primary elutriation system, means for diluting said products with water purer than the biochemically fouled liquid digestion products contained therein, means for collecting the settleable solids from the dilute mixture and for freeing same by decantation from a major fraction of excess dilute liquor in the primary elutriation settling tank, means for discarding the decantate, means for transferring the concentrated elutriated sludge to the secondary digester, means for conducting sludge products from this digester to the secondary elutriation system, means for diluting said products with water purer than the liquid fraction of said products, means for conducting said dilute mixture to the secondary elutriation settling tank, means for collecting the settleable solids and for freeing same by decantation from a major fraction of the excess dilute liquor in said tank, means for transferring all or any fraction of the elutriate freed from this secondary elutriation tank for use in the primary elutriation dilution step between stages of digestion, and means for transferring the secondary concentrated elutriated sludge to a mechanical filtration system for further dewatering.

8. In a sewage treatment plant a sedimentation basin for collecting settleable sewage solids and decanting water from same, and a solids destruction and dewatering system having associated therewith a primary heated digester receiving settled sludge from the sedimentation basin, a primary elutriation dilution, sedimentation and elutriate decantation tank system receiving liquid products from the primary digester mixed with diluting water, a secondary digester receiving concentrated sludge from the primary elutriation system, a secondary elutriation dilution, sedimentation and elutriate decantation system, consisting of at least two tanks connected in series and receiving liquid sludge products from the secondary digester, and a mechanical filtration system for receiving and further dewatering concentrated elutriated sludge from the last of the series of the secondary elutriation tanks, means for delivering fresh sludge from the sedimentation basin to the heated primary digester, means for conducting liquid digestion products from the primary digester to the primary elutriation system, means for diluting said products with water purer than the biochemically fouled liquid digestion products, means for conducting said dilute mixture to the primary elutriation settling tank, means for collecting the settleable solids therein and for freeing same by decantation from a major fraction of the excess dilute liquor, means for discarding the decantate, means for transferring the concentrated elutriated sludge to the secondary digester, means for delivering sludge products from this digester through the successive elutriation tanks in series so the purest water used for elutriation dilution enters the final tank of the series and the decantate removed therefrom is used for diluting the products leaving the secondary digester to enter the next to the final elutriation tank of the series, and means for transferring all or any fraction of the final decantate freed from the elutriation tank series for reuse in the primary elutriation dilution step between stages of digestion, and means for delivering the final concentrated elutriated sludge of the series to the mechanical filtration system for further dewatering.

9. In a sewage treatment plant a sedimentation basin system for collecting sewage solids and decanting water from same and a solids destruction and dewatering system having associated therewith primary digestion and sludge heating equipment for receiving settled sludge from the sedimentation basin and for keeping same biologically active, a primary elutriation-dilution, sedimentation and elutriate decantation tank system consisting of at least two sedimentation tanks connected in parallel and receiving liquid products from the primary digestion system mixed with diluting water, a secondary digestion tank system receiving concentrated sludge from the primary elutriation tanks, a secondary elutriation dilution, sedimentation and elutriate decantation system consisting of at least two tanks connected in series and receiving liquid sludge products from the secondary digestion system and a mechanical filtration system for receiving and further dewatering concentrated elutriated sludge from the last unit or units of the secondary elutriation tank system, means for delivering fresh sludge from the sedimentation basin system to the primary digestion system, means for conducting liquid digestion products from said primary digestion to the primary elutriation system, means for diluting said products with water purer than the biochemically fouled liquid portion of said products, means for conducting said dilute mixture to the primary elutriation settling tanks operating in parallel, means for collecting the settleable solids therein and for freeing same by decantation from a major fraction of the excess dilute liquor, means for discarding the decantate, means for transferring the concentrated, elutriated, primary digester sludge to the secondary digestion storage system, means for conducting the sludge products from this system through the tanks of the secondary elutriation system in series of successive dilutions and resettlings so the purest water used for elutriation dilution enters the final tank and the decantate removed therefrom is used for diluting the sludge sediment entering the preceding tank and means for recirculating all or any fraction of the final decantate leaving the secondary elutriation sedimentation system back to the primary elutriation system to correspondingly increase the effective degree of dilution and sedimentation between stages of digestion and means for delivering the final concentrated elutriated sludge of the series to the mechanical filtration system for further dewatering.

10. In a sewage solids dewatering and destruction process according to claim 9 wherein the two separate systems of multiple elutriation tanks are so cross connected that they may be used interchangeably and independently between stages of digestion and between the last stage of digestion and mechanical filtration.

11. In a sewage treatment system having the production of digested sludge in separate units operating in successive processing stages, at least one of which is a digestion unit and kept biologically active by adequate seeding with well digested sludge and heating and another of which operates with less heat and biological activity, the process of diminishing between said stages the water content and gross volume of the biologically active material by withdrawing fluid digestion products from the more active stage, diluting same with water purer than the biochemically fouled water contained in said products, followed by the hydraulic subsidence of the settleable solids to a thickened sludge in a settling basin selected for the purpose, removal of the top water from same and delivery of the thickened sludge to the less active digestion stage.

12. In a sewage treatment system having the production and storage of digested sludge in separate units operating in successive processing stages, at least one of which is kept biologically active by adequate seeding and heating with well digested sludge and another of which operates with less heat and biological activity and serves to equalize fluctuations in sludge disposal, the process of diminishing between said stages the water content and gross volume of the biologically active material by withdrawing fluid digestion products from the more active stage, diluting same with water purer than the biochemically fouled water contained in said products, followed by the hydraulic subsidence of the settleable solids to a thickened sludge in a settling basin selected for the purpose, removal of the top water from same and delivery of the thickened sludge to the less active storage stage.

13. In a sewage treatment system having the production and storage of digested sludge in separate units operating in successive processing stages, at least one of which is kept biologically active by adequate seeding with well digested sludge and heating and another of which operates with less heat and biological activity and serves to further concentrate washed sludge solids by slow sedimentation and to also equalize fluctuations in sludge disposal, the process of diminishing between said stages the water content and gross volume of the biologically active material by withdrawing fluid digestion products from the active stage, diluting same with water purer than the biochemically fouled water contained in said products, followed by hydraulic subsidence of the settleable solids to a thickened sludge in a settling basin selected for the purpose, removal of top water from same and delivery of the thickened sludge to the other unit for additional solids concentration and sludge storage.

14. In a sewage treatment system having the production of digested sludge in separate units operating in successive processing stages, at least two of which are digestion units and are kept biologically active by seeding with well digested sludge and heating and another of which operates with less heat and biological activity and serves to equalize fluctuation in sludge disposal, the process of diminishing between at least two of said biologically active stages the water content and gross volume of the biologically active material produced in the initial active stage by withdrawing fluid digestion products from said stage, diluting same with water purer than the biochemically fouled water contained therein, followed by the hydraulic subsidence of the settleable solids to a thickened sludge in a settling basin selected for the purpose, removal of the top water from same and delivery of the thickened sludge to a following heated biologically active digestion unit and delivery of the more thoroughly digested sludge from said last unit to the less active unit.

15. In a sewage treatment system having the production of digested sludge in separate units operating in successive processing stages, at least two of which are digestion units and are kept biologically active by seeding with well digested sludge and heating and another of which operates with less heat and is relatively less active and serves to equalize fluctuation in sludge disposal, the process of diminishing between at least two of the biologically active stages and between the biologically active and less active stages the water content and gross volume of the biologically active material produced in the biologically active stages by first withdrawing fluid digestion products from the initial active digestion stage, diluting same with water purer than the biochemically fouled water contained therein, followed by the hydraulic subsidence of the settleable solids to a thickened sludge in a settling basin selected for the purpose, removal of the supernatant water from said basin, discarding of same, delivery of the thickened sludge to a following heated and active digestion unit, repeating the steps of withdrawing fluid digestion products from this stage, dilution of same with relatively pure water, reconcentration of settleable solids in a second separate sedimentation basin, removal of the supernatant water from same, delivery of any portion of said top water to the initial dilution and solids concentration step and delivery of the thickened sludge from the second sedimentation basin to the less active stage.

16. In a sewage treatment system having the production of digested sludge in separate units operating in successive processing stages, at least two of which are digestion units and are kept biologically active by seeding with well digested sludge and heating and another of which operates with less heat and is relatively less active and serves to equalize fluctuation in sludge disposal, the process of diminishing between at least two of the biologically active stages and between the biologically active and less active stages the water content and gross volume of the biologically active material produced in the biologically active stages by first withdrawing fluid digestion products from the initial active digestion stage, diluting same with water purer than the biochemically fouled water contained therein, followed by the hydraulic subsidence of the settleable solids to a thickened sludge in a settling basin selected for the purpose, removal of the supernatant water from said basin, discarding of same, delivery of the thickened sludge to a following heated and active digestion unit, repeating the steps of withdrawing fluid digestion products from this stage, dilution of same with relatively pure water, reconcentration of settleable solids in a second separate sedimentation basin, removal of the supernatant water from same, and delivery of the thickened sludge from the second sedimentation basin to the less active stage.

17. In a sewage treatment system having the production of digested sludge in separate units operating in successive processing stages, at least one of which is a digestion unit and kept biologically active by adequate seeding with well digested sludge and heating and another of which operates with less heat and biological activity and serves to equalize fluctuation in sludge disposal followed by partial dewatering of the final sludge in mechanical filtration equipment, the process of initially partially dewatering the biologically active sludge between stages by diminishing between said stages the water content and gross volume of the biologically active material by, withdrawing digested sludge from the less active storage stage, dilution of same with water purer than the sludge water contained in the stored sludge, followed by the hydraulic subsidence of the settleable solids to a thickened sludge in a settling basin selected for the purpose, removal of the top water from same and delivery of the thickened washed sludge to processing and further dewatering in the mechanical filtration equipment.

18. Process according to claim 16 wherein any desired portion of the top water overflowing the final sludge washing and settling basin is re-used for the dilution and sludge concentration steps employed between the active and less active sludge processing stages.

19. In a sewage treatment system having the production of digested sludge in separate units operating in successive processing stages, at least one of which is kept biologically active by adequate seeding with well digested sludge and heating and another of which operates with less heat and biological activity and serves to equalize fluctuation in sludge disposal followed by partial dewatering of the final digested sludge in mechanical filtration equipment, the process of initially partially dewatering the biologically active sludge between stages by diminishing between said stages the water content and gross volume of the biologically active material by repeatedly washing the settleable digested solids taken from the less active stage by dilution with relatively pure water and sedimentation of the sludge solids in at least two separate settling basins selected for the purpose and operating in countercurrent series with delivery of any portion of the top overflow water from the countercurrent washing system to the sludge washing and concentration step used between stages and delivery of the finally washed digested product from the countercurrent washing system to mechanical filtration equipment for further partial dewatering of same.

ALBERT L. GENTER.
CLYDE C. KENNEDY.

REFERENCES CITED

The following references are of record in the file of this patent:

UNITED STATES PATENTS

| Number | Name | Date |
|---|---|---|
| 1,739,302 | Gregorich | Dec. 10, 1929 |
| 1,999,973 | Genter | Apr. 30, 1935 |
| 2,129,266 | Fischer et al. | Sept. 6, 1938 |
| 2,190,598 | Fischer | Feb. 13, 1940 |
| 2,259,688 | Genter | Oct. 21, 1941 |
| 2,293,028 | Fischer | Aug. 18, 1942 |